W. A. LAVERTY,

Assignor, by mesne assignments, to WANAMAKER & BROWN.

Neck-Tie.

No. 8,934. Reissued Oct. 14, 1879.

Witnesses:

S. A. Burtt.

W. F. Kircher

Inventor:

Wm. J. Laverty, by John A. Wiedersheim

ATTORNEY.

THE NORRIS PETERS CO., PHOTO-LITHO., WASHINGTON, D. C.

UNITED STATES PATENT OFFICE.

WILLIAM A. LAVERTY, OF PHILADELPHIA, PENNSYLVANIA, ASSIGNOR, BY MESNE ASSIGNMENTS, TO WANAMAKER & BROWN, OF SAME PLACE.

IMPROVEMENT IN NECK-TIES.

Specification forming part of Letters Patent No. 216,421, dated June 10, 1879; Reissue No. 8,934, dated October 14, 1879; application filed September 2, 1879.

*To all whom it may concern:*

Be it known that I, WILLIAM A. LAVERTY, of the city and county of Philadelphia, and State of Pennsylvania, have invented a new and useful Improvement in Neck Ties or Scarfs, of which the following is a specification, reference being had to the accompanying drawings, making part of this specification, in which—

Figure 1:
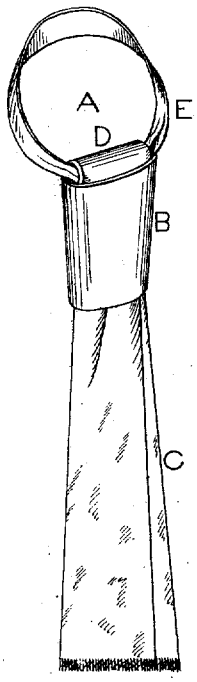
Figure 3:
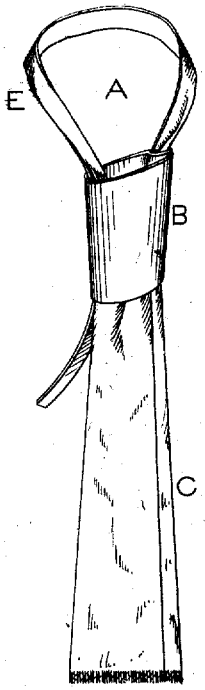
Figure 2:
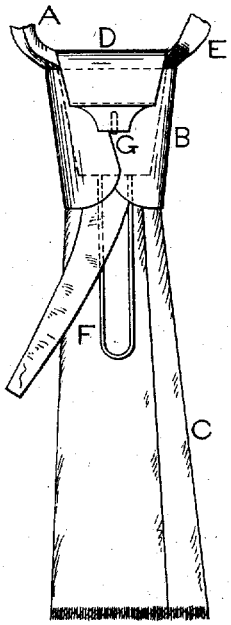
Figure 4:
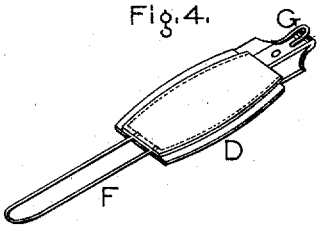

Figure 1 is a perspective view of a neck-scarf embodying my invention. Fig. 2 is a rear view thereof. Fig. 3 is a perspective view of a scarf with a part thereof removed. Fig. 4 is a perspective view of a detached portion.

Similar letters of reference indicate corresponding parts in the several figures.

My invention consists of a neck-scarf the knot whereof is provided with a movable head having a rigid pusher, which is located behind the scarf-aprons, or between the aprons and the knot or aprons and the neck-band when the scarf is in position on the neck, whereby the head may be readily and conveniently opened to admit the neck-band, and closed or tightened when said band is adjusted on the neck, without in either case disturbing other parts of the scarf.

It also consists in rendering the head adjustable on and removable from the knot, so that when the head is worn a fresh wearing-surface may be presented or an open-top scarf produced.

Referring to the drawings, A represents a neck-scarf having a knot, B, aprons C, head D, and neck-band E, the aprons being secured to and depending from the knot.

The head D forms a fold at the top of the knot, to which it is attached, and one end, which is passed loosely through the knot, has fastened to it in any desirable manner a pusher, F, made of wire or other suitable rigid material, and appearing behind the aprons, or between the aprons and knot or aprons, and neck-band when the scarf is in position on the neck.

It will be seen that the head may be readily and conveniently opened by raising the stiffener or pusher F, for the purpose of enlarging the space for the insertion of the end of the neck-band intended to be passed through the knot, and when the scarf is properly located on the neck the head may be tightened on the contiguous portion of the neck-band or lowered by drawing down said stiffener or pusher F, thus presenting a closed-top scarf.

In order to render the head removable from the knot the former is attached to the latter by means of a pointed or pin hook, G, which, secured to the upper or outer end of the head, is adapted to engage with the back of the knot.

It is evident that by disengaging the hook or fastening from the knot the head may be entirely removed from the knot and an open-top scarf produced. Furthermore, when a closed scarf is desired the hook or fastening G may be made to engage with the knot at different places of its back, thus changing or adjusting the fold or bend of the head, whereby when one fold or bend becomes worn by the chin or beard another fold or bend may be formed, thus preserving the freshness of the scarf and increasing the length of the wear thereof.

Having thus described my invention, what I claim as new, and desire to secure by Letters Patent, is—

1. The neck-scarf having a movable head provided with a pusher, F, of rigid material, substantially as and for the purpose set forth.

2. The neck-scarf having a head, D, one end of which is free within the knot, and the other end connected to the back of the knot by means of a pointed or pin hook, G, adapted to be attached to said back at any desired point, substantially as and for the purpose set forth.

3. The neck-scarf having a removable head provided at one end with a hook or equivalent fastening device, and at the other end with a stiffener or pusher, substantially as and for the purpose set forth.

WM. A. LAVERTY.

Witnesses:

JOHN A. WIEDERSHEIM,
W. F. KIRCHER.